US 9,227,328 B2

(12) United States Patent
Bicchi et al.

(10) Patent No.: US 9,227,328 B2
(45) Date of Patent: Jan. 5, 2016

(54) VARIABLE PLIABILITY ACTUATOR

(75) Inventors: Antonio Bicchi, Massa (IT); Manuel Giuseppe Catalano, Pisa (IT); Manolo Garabini, Ceparana (IT); Giorgio Grioli, Macerata (IT)

(73) Assignee: UNIVERSITA DI PISA CENTRO INTERDIPARTIMENTALE DI RICERCA "E. PIAGGIO", Pisa (IT)

( * ) Notice: Subject to any disclaimer, the term of this patent is extended or adjusted under 35 U.S.C. 154(b) by 1051 days.

(21) Appl. No.: 13/275,644

(22) Filed: Oct. 18, 2011

(65) Prior Publication Data

US 2012/0096973 A1      Apr. 26, 2012

(30) Foreign Application Priority Data

Oct. 21, 2010   (EP) .................................... 10188315

(51) Int. Cl.
| B25J 17/00 | (2006.01) |
| B25J 17/02 | (2006.01) |
| B25J 18/00 | (2006.01) |
| B25J 19/06 | (2006.01) |
| B25J 9/08 | (2006.01) |
| B25J 9/10 | (2006.01) |

(52) U.S. Cl.
CPC ........ *B25J 19/068* (2013.01); *B25J 9/08* (2013.01); *B25J 9/10* (2013.01); *Y10T 74/20317* (2015.01)

(58) Field of Classification Search
CPC ............ B25J 9/1641; B25J 9/08; B25J 9/104; B25J 9/1045; B25J 19/068; Y10T 74/20323; F16H 2007/0806; F16H 2057/121
See application file for complete search history.

(56) References Cited

U.S. PATENT DOCUMENTS

| 1,672,400 | A | * | 6/1928 | West ............................ 464/109 |
| 4,044,633 | A | * | 8/1977 | Lee .............................. 475/182 |
| 4,392,776 | A | * | 7/1983 | Shum ......................... 414/744.5 |
| 4,693,666 | A | * | 9/1987 | Garin ......................... 414/744.5 |
| 4,804,220 | A | * | 2/1989 | Rosheim ...................... 294/111 |
| 5,502,363 | A | * | 3/1996 | Tasch et al. ............. 318/568.11 |
| 6,084,373 | A | * | 7/2000 | Goldenberg et al. .... 318/568.11 |
| 7,013,750 | B1 | * | 3/2006 | Kazami ..................... 74/490.05 |

(Continued)

OTHER PUBLICATIONS

Catalano, et al., "VSA-HD: From the enumeration analysis to the prototypical implementation", Intelligent Robots and Systems (IROS), Oct. 18, 2010, pp. 3676-3681.
Catalano, et al., "Mechanism design for Variable Stiffness Actuation based on enumeration and analysis of performance", Robotics and Automation (ICRA), May 3, 2010, pp. 3285-3291.

(Continued)

*Primary Examiner* — William Kelleher
*Assistant Examiner* — Jake Cook
(74) *Attorney, Agent, or Firm* — Browdy and Neimark, PLLC

(57) ABSTRACT

A variable pliability actuator is provided to move a movable component including two electric rotary motors, at least one output shaft connected to be set in rotation by the motors around a rotation axis, an elastic transmission system to enable motion transfer from the motors to the output shaft and to vary the pliability the output shaft, a control unit to adjust at least the pliability of the output shaft through the elastic transmission system, and a holding structure to hold at least the motors, the elastic transmission system, the output shaft and the control unit. The holding structure has a driving output placed at the outer surface controlled by the output shaft and connected to set the movable component in rotation about the rotation axis, at least one stiff coupling element to enable a stiff connection of the holding structure, and a support output opposite the driving output, substantially coaxial with the rotation axis and partly housing and stabilizing the rotation of the movable component.

11 Claims, 4 Drawing Sheets

(56) References Cited

U.S. PATENT DOCUMENTS

| | | | |
|---|---|---|---|
| 2005/0226703 A1* | 10/2005 | Konstas et al. | 414/222.07 |
| 2006/0028164 A1* | 2/2006 | Kono et al. | 318/625 |
| 2007/0162404 A1* | 7/2007 | Gorelik et al. | 706/2 |
| 2007/0199399 A1* | 8/2007 | Okazaki et al. | 74/490.05 |
| 2007/0299427 A1* | 12/2007 | Yeung et al. | 606/1 |
| 2008/0229862 A1* | 9/2008 | Nakamoto | 74/490.04 |
| 2011/0045932 A1* | 2/2011 | Fauteux et al. | 475/221 |
| 2011/0167946 A1* | 7/2011 | Kim et al. | 74/490.04 |
| 2011/0252921 A1* | 10/2011 | Nakagiri et al. | 74/665 R |
| 2013/0178297 A1* | 7/2013 | Pane et al. | 464/66.1 |

OTHER PUBLICATIONS

Choi, et al., "A variable stiffness joint using leaf springs for robot manipulators", Robotics and Automation, May 12, 2009, pp. 4363-4368.

Koganezawa, et al., "Three DOF wrist joint-control of joint stiffness and angle", Industrial Electronics (ISIE), Jul. 4, 2010, pp. 1973-1979.

Petit, et al., "Bidirectional antagonistic variable stiffness actuation: Analysis, design & Implementation", Robotics and Autotmation (ICRA), May 3, 2010, pp. 4189-4196.

EP Search Report from corresponding EP application No. 10 18 8315, dated Apr. 7, 2011.

* cited by examiner

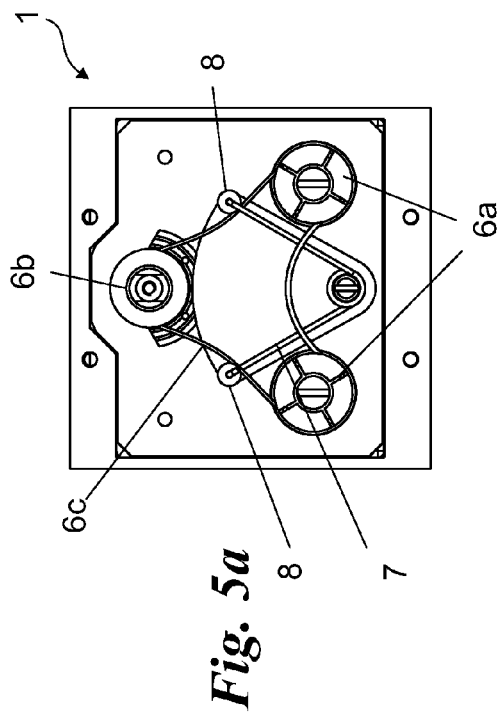
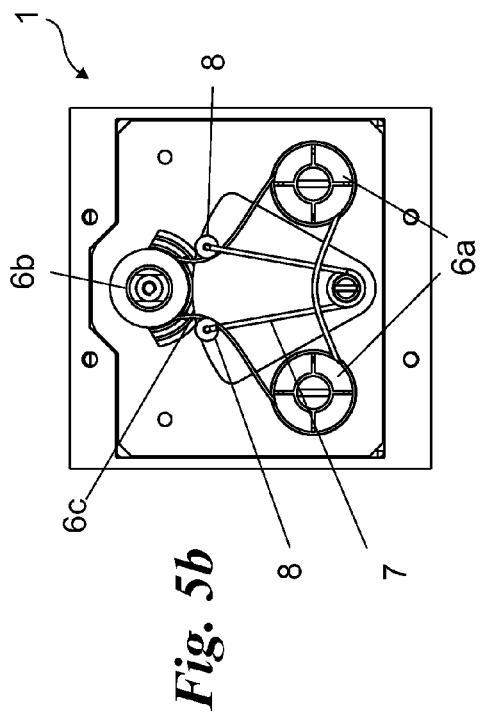
Fig. 5a
Fig. 5b
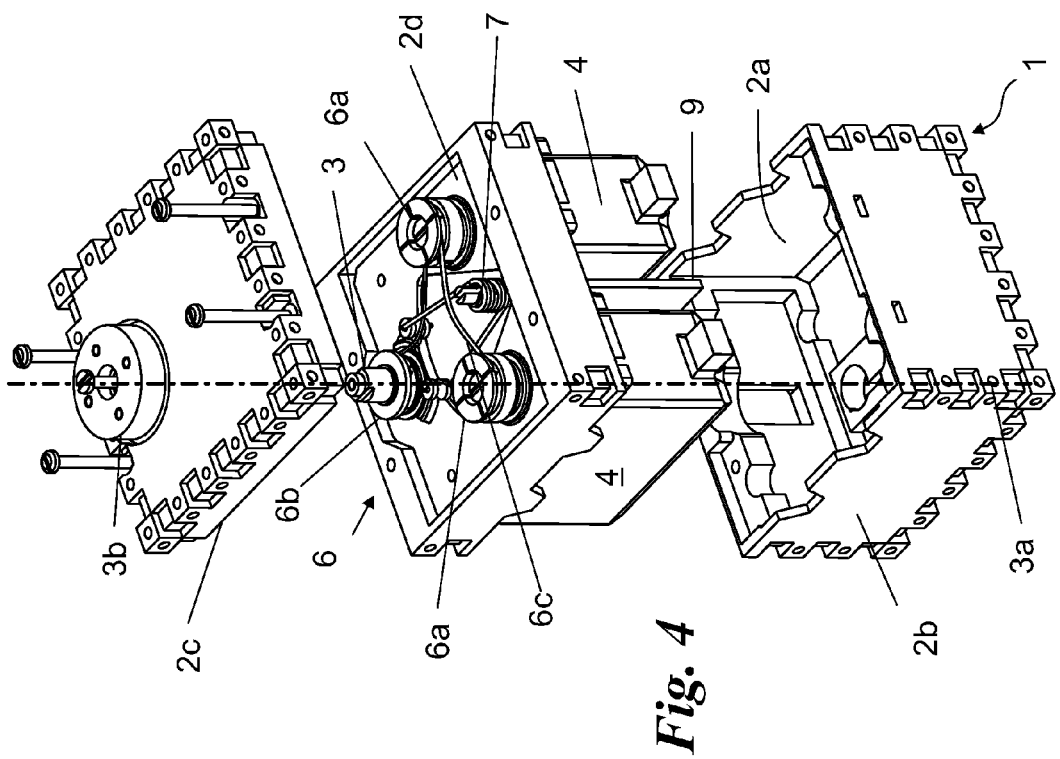
Fig. 4

VARIABLE PLIABILITY ACTUATOR

FIELD OF THE INVENTION

The present invention relates to a variable pliability actuator, of the type pointed out in the preamble of the first claim.

It is of the type adapted to be used in a robot, or any other device equipped with suitable members capable of sensing the surrounding environment and interacting therewith. In particular, the actuator is disposed between two components of a robot in order to move said two components relative to each other, varying the pliability between them.

Preferably, the variable pliability actuator is adapted to be used in all applications in which a person can be present within the robot's operating area or in the neighborhood thereof.

It is therefore arranged in industrial robots used in operations concerning handling or assembling of components or disposed in orthopedic prosthesis, i.e., an apparatus adapted to replace one part of the human body, such as an arm or a leg for example. Finally, the actuator is adapted to be used in applications of service and/or home robotics and in all applications in which a user and a robot mutually interact or are in the neighborhood of each other.

DESCRIPTION OF THE PRIOR ART

It is known that presently the industrial automation, i.e., use of robots or the like for control and production, is becoming increasingly more predominant, so as to enable the human operator to be replaced at least for physical execution of the operations.

These robots usually consist of a fixed base, a series of intermediate elements that can be mutually moved and an end member, such as pliers or other work tool suitable to carry out a working operation, a grip and release operation for example. Robots further comprise at least one actuator including a joint adapted to connect two components of a robot allowing a relative motion between them, and one or more motors accomplishing the aforesaid movements.

Therefore, one of the most important elements in a robot is the actuator that, based on its pliability, i.e., ease of relative movement between the inner components, determines the robot's pliability. In other words, the actuator pliability affects the exchange of force between the robots and the external environment during planned and/or accidental interactions.

In particular, the actuator defines the mechanical impedance, determining the ability to absorb impacts and vibrations and the robot performance in terms of speed and accuracy in carrying out the assigned operations.

For instance, in order to ensure the correct positioning of the piece, the robot must have a rigid structure, i.e., a structure with a low pliability, so that it can guarantee a high stability and low vibrations.

In addition, more and more frequently an operator has to work in the vicinity of a robot and therefore a good degree of safety is to be ensured to the operator. In fact, during movement, the robot may accidentally knock against the operator and it is therefore necessary that the robot structure should have a high pliability, which means that its elasticity must be as high as possible to enable the robot to absorb the whole of the impact energy, thus avoiding injuries to the operator and damages to the inner components of the robot system.

Presently, it is possible to fundamentally distinguish two types of actuators: the rigid ones and those having a fixed pliability. In the first type, the actuator pliability is very low and cannot be modified, while in the actuators belonging to the second type a given pliability can be set before starting a working operation. Therefore, in the last-mentioned type, it is possible to select a pliability value which, for the working operation the robot is about to carry out, is a compromise between a good accuracy and a low damage in case of impact.

The known art mentioned above has some important drawbacks.

In fact, the actuators presently used at best allow a single pliability value to be selected for the whole process. This value therefore is only a compromise between the above described requirements and does not represent an ideal solution.

For this reason, in order to ensure an appropriate security for the operator, usually a solution offering a high pliability and a limited movement speed is chosen so as to simultaneously have minimum oscillations and good working quality.

Therefore, the working speed of a robot appears to be less than that obtainable by exploiting the potential capacity of the robot itself.

In conclusion, the presently known actuators are the cause for slowing down in production and for the consequent increase in the production costs.

Said problems are also present in service robotics, when robots are used in the home field where there is an almost continuous interaction between robot and person.

Specifically, the problem concerning safety is particularly felt in making games and other devices used by children, where it is of fundamental importance to avoid dangers under any use condition.

Another important problem is represented by the complexity and high manufacturing costs typical of a robot. This is the result of complex assembling operations combined with a great number of connections to be made. In fact, a robot is usually characterized by the presence of a great number of cables that are required for connecting the actuators to an external control unit necessary for command and control of the operations performed by a robot.

SUMMARY OF THE INVENTION

Given this situation, the technical aim underlying the present invention is to conceive a variable pliability actuator capable of substantially obviating the mentioned drawbacks.

Within the scope of this technical task it is an important aim of the invention to conceive an actuator capable of ensuring optimal quality values in working and a high safety degree at every instant.

Another important aim of the invention is to make an actuator allowing the whole potential capacity typical of a robot to be fully exploited so as to achieve lower production times and costs.

It is a further aim of the invention to conceive an actuator that can be easily connected to the remainder of the structure constituting a robot and that allows manufacture of a robot with greater simplicity.

Another aim not of minor importance is to produce an actuator requiring a smaller number of electric connections to an external unit.

Therefore, it is also an aim of the invention to make a variable pliability actuator enabling robots of reduced costs to be manufactured which however are characterized by high performance.

Said technical aim and the objects specified are achieved by a variable pliability actuator adapted to move a movable component. The variable pliability actuator comprises: two electric motors of the rotary type; an output shaft adapted to be set in rotation by the two electric motors around a rotation axis; an elastic transmission system adapted to enable motion transfer from the motors to the output shaft and to vary the pliability of the output shaft; a control unit integrated in the variable pliability actuator and adapted to adjust the pliability of the output shaft through the elastic transmission system; and a holding structure defining an outer surface and an inner volume adapted to hold the two electric motors, the elastic transmission system, the output shaft and control the unit; the holding structure having a driving output placed at the outer surface, which is controlled by the output shaft and adapted to set the movable component in rotation about the rotation axis, at least one stiff coupling element adapted to enable a stiff connection of said holding structure; and a support output opposite to the driving output and substantially coaxial with the rotation axis and adapted to partly house the movable component stabilizing the rotation of the movable component.

BRIEF DESCRIPTION OF THE DRAWINGS

The features and advantages of the invention are hereinafter clarified by the detailed description of preferred embodiments of the invention, with reference to the accompanying drawings, in which:

FIG. 4 is an exploded perspective view of a second actuator according to the invention;

FIG. 5a is a plan view of a configuration of a middle portion of the variable pliability actuator seen in FIG. 4;

FIG. 5b shows a second configuration of the middle portion of the actuator in FIG. 4;

DESCRIPTION OF A PREFERRED EMBODIMENT

Figure 1:
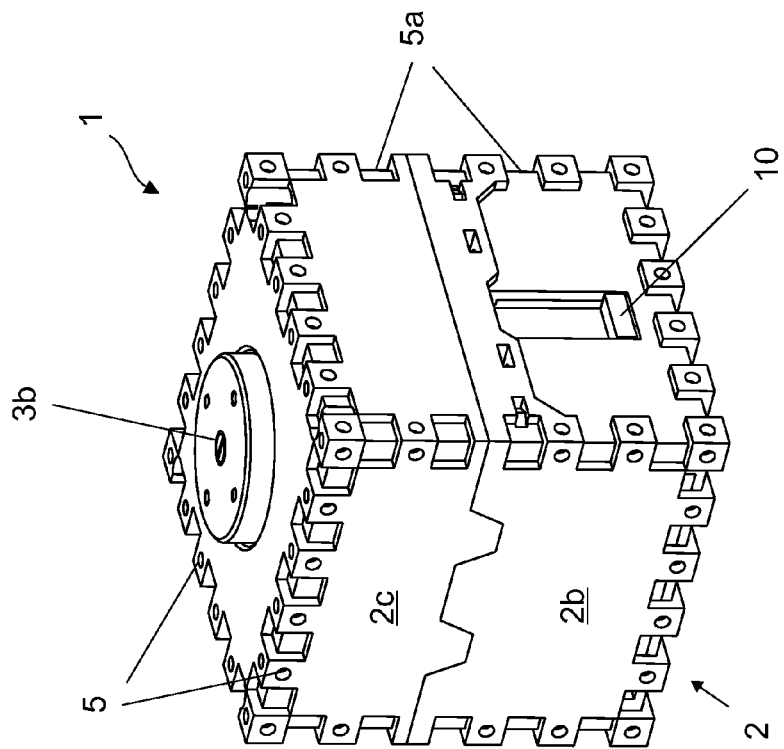
FIG. 1 is a perspective view in a closed position of a variable pliability actuator according to the invention.

With reference to the drawings, the variable pliability actuator according to the invention is generally denoted at number 1.

It can be advantageously applied to a robot 100, i.e., a device adapted to be used in the industrial field for example, for handling and assembling operations. In particular, robot 100 is suitable to handle and assemble parts of reduced sizes, such as circuits. It is pointed out that also intended by the term "robot" is, in addition to the aforesaid devices, service and prosthesis robotics, that is to say mechanical devices adapted to replace a missing part of the body such as a limb, or to integrate a damaged part.

In particular, at least one variable pliability actuator 1 is located inside a robot 100 and, more specifically it is located intermediate between a pair of components that can be mutually moved. It is rigidly secured to an integral component 101 and moves a movable component 102 relative to the system made up of component 101 and the actuator 1 itself.

The variable pliability actuator 1 comprises a holding structure 2 defining an inner volume 2a adapted to accommodate almost all of the elements constituting actuator 1, at least one output shaft 3 adapted to determine motion of the movable component 102, two electric motors 4 of the rotary type adapted to set the output shaft 3 in rotation about a rotation axis 3a, and an elastic transmission system adapted to transmit motion from motors 4 to shaft 3 varying the pliability of shaft 3 relative to actuator 1 and consequently of the movable component 102 relative to the integral component 101.

In order to facilitate control of the variable pliability actuator 1, it comprises a plurality of sensors disposed at least at the motors 4 and output shaft 3. In particular, each electric motor 4 is a servomotor, i.e., a device consisting of a motor equipped with a mechanical reduction, a feedback system provided with at least one sensor adapted to control the position of the motor axis, and control electronics for governing the operation thereof.

These electric motors are then powered by a powering system not shown in the figures, which can consist of inner batteries or suitable cables or contacts adapted to connect actuator 1 for current passage with an outer source.

The holding structure 2 preferably has a prismatic shape and, in detail, it has the shape of a cube. The holding structure 2 advantageously consists of at least two distinct parts that can be mutually coupled: a lower portion 2b inside which at least motors 4 are housed, and a lid 2c in which shaft 3 is partly housed, which lid is suitable for coupling with the lower portion 2b thus defining said inner volume 2a. Finally, said coupling between the lower portion 2b and lid 2c is obtained by releasable connecting means such as screws, shown in FIGS. 2 and 4.

The holding structure can also comprise an intermediate plate 2d adapted to be positioned in the junction region between the lower portion 2b and lid 2c and to which almost all of the elements constituting actuator 1 are secured. In particular, the electric motors 4 are secured to the lower part of the intermediate portion 2d, i.e., the part facing the lower portion 2a, while the elastic transmission system and shaft 3 are secured to the upper part of said intermediate plate 2d.

Provided on the outer surface of structure 2 is a plurality of stiff coupling elements 5 enabling a rigid connection to be carried out between the holding structure 2 and an integral component 101 and/or another actuator 1. In detail, the stiff coupling element 5 is adapted to form a connection of the releasable type advantageously obtained by means of threads or other similar elements suitable for achievement of said releasable rigid connection, and preferably the coupling element 5 consists of a threaded hole.

Provision of the coupling elements 5 allows a plurality of components 101 and/or actuators 1 to be simultaneously joined to a single actuator 1. In particular, each outer side face belonging to the cube defined by the holding structure 2 is provided with at least one coupling element 5, and more specifically with a plurality of coupling elements 5, along the edges of each side face.

Figure 8:
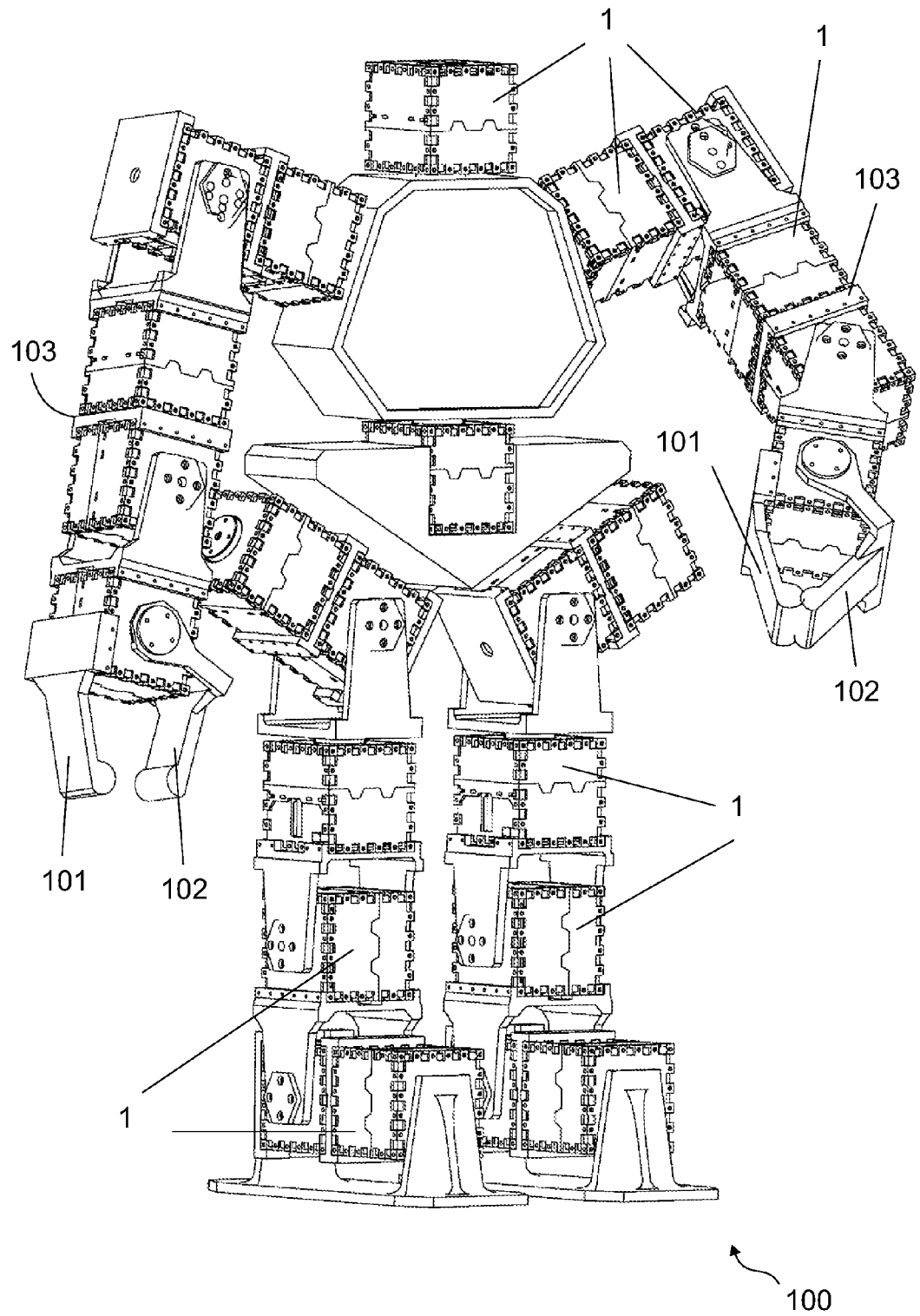
FIG. 8 shows a device provided with a plurality of actuators.

Finally, in order to facilitate the rigid connection, at least one friction fitting 5a such as a hollow, is advantageously formed between the coupling elements 5 enabling the mutual positioning of the elements to be joined to be facilitated. In particular, if two actuators 1 are wished to be joined, the connection can contemplate use of at least one suitable interface 103, i.e., a shaped plate that, due to the presence of the coupling elements 5, is rigidly connected to both the actuators 1, as shown in FIG. 8.

Figure 2:
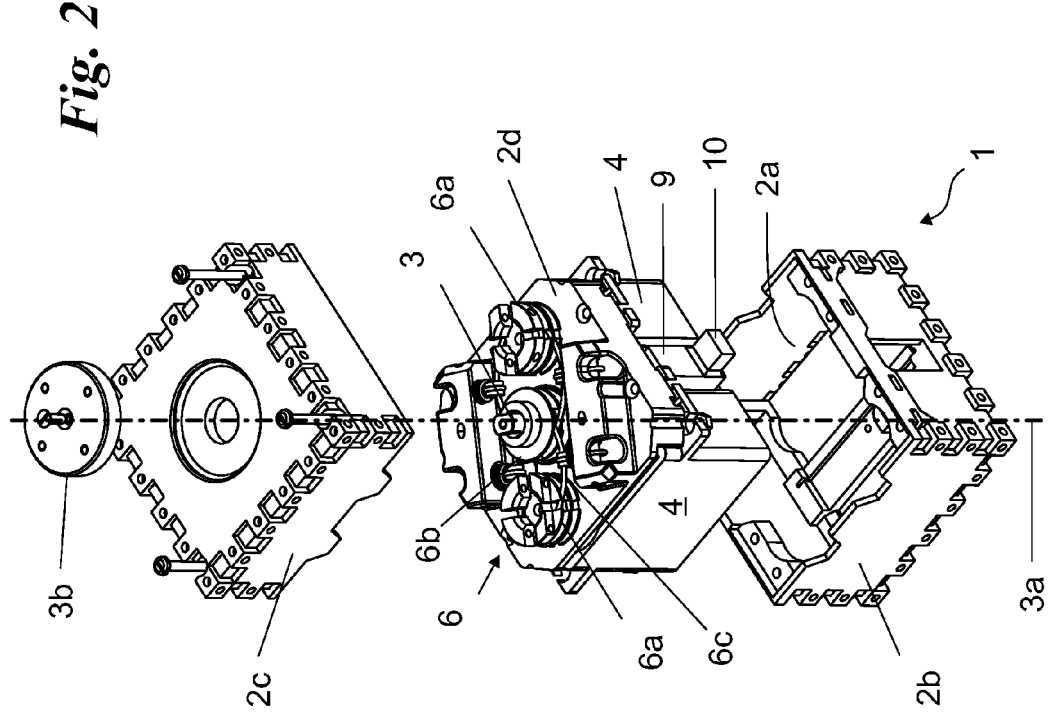
FIG. 2 shows an exploded perspective view of FIG. 1.

Provided at lid 2c is a driving output 3b rigidly connected to the output shaft 3 and adapted to set the movable component 102 in rotation relative to actuator 1 around the rotation axis 3*a*. In detail, this driving output 3*b* is coaxial with axis 3*a* and, as shown in FIGS. 2 and 4, comprises a disc secured to the output shaft 3 and connectable to the movable component 102 through releasable connection means making shaft 3 substantially integral with the movable component 102.

Finally, said rotation of the movable component 102 relative to actuator 1 is made steadier by providing the holding structure 2 with a support output 2*e* opposite to the driving output 3*b* and substantially coaxial with the rotation axis 3*a* and preferably idle; alternatively, said output too can be a driving output and be integral with shaft 3.

Figure 7:
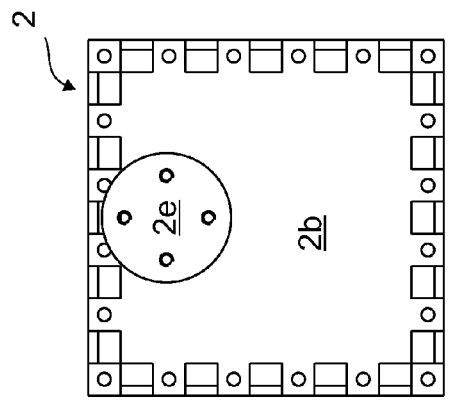
FIG. 7 diagrammatically shows a bottom view of the variable pliability actuator according to the invention.

This support output 2*e* preferably consists of a circular hollow inside which a pin or a suitable portion matching the shape of the movable component 102 is advantageously housed. Alternatively, a suitable disc, shown in FIG. 7, can be provided, which is pivotally mounted on said output and is adapted to be secured by means of screws or the like to the movable component 102.

Finally, the support output 2*e* can be advantageously equipped with a bush, a bearing or other similar element adapted to reduce friction between the movable component 102 and actuator 1.

Alternatively, in place of a driving output 3*b* and a support output 2*e*, actuator 1 can be provided with two driving outputs 3*b* almost coaxial with the rotation axis 3*a* and placed on two opposite faces of the holding structure 2.

The elastic transmission system is adapted to mechanically vary the pliability of the output shaft 3 through use of non-linear elastic transmissions between the two motors 4 and the output shaft 3. In particular, it is adapted to vary the pliability between a maximum value and a minimum value at which, by applying a given force to the movable component 102, a rotation of the movable component 102 relative to the fixed one 101 occurs which is smaller than that taking place if the same force is applied to actuator 1 in a maximum pliability configuration.

The motion-transmitting system comprises motion transferring means 6 adapted to connect motors 4 to shaft 3 for motion passage, and at least one spring body 7 adapted to be interposed in said motion transmission connection, varying the force transmitted by each motor 4 to the output shaft 3 in a continuous manner.

The motion transferring means 6 comprises two driving pulleys 6*a* each rigidly connected to one of the electric motors 4, a driven pulley 6*b*, rigidly connected to the output shaft 3, and at least one flexible transmission element 6*c* suitable for motion transfer from said driving pulleys 6*a* to the driven pulley 6*b*, i.e., from the two electric motors 4 to the output shaft 3.

The flexible transmission element 6*c* is made up of a cable, a belt, a thread or wire, or other element of the inextensible type adapted to transmit motion. Preferably, the flexible element 6*c* is an open thread of synthetic fiber. In detail, the flexible element 6*c* is of thermoplastic polyethylene. More specifically, it is an ultra high molecular weight polyethylene (UHMWPE), also known as high modulus of elasticity polyethylene (HMPE) and, in greater detail, the flexible element 6*c* is made of a material known with the trade mark DYNEEMA and coated with polyester.

Finally, each flexible element 6*c*, in order to avoid slipping actions with pulleys 6*a* and 6*b*, is suitably and rigidly secured to said pulleys 6*a* and 6*b* by means of knots or suitable mechanical anchoring devices adapted to avoid said slipping actions, such as shaped anchors.

The motion transferring means 6, in addition to transmitting the motion of motors 4 to shaft 3, is adapted to vary the pliability of the output shaft 3, adjusting the pliability of the output shaft 3, instant by instant, to the type of movement that the robot 100 is carrying out. This variation is obtained, as better pointed out in the following, by imposing two different rotation movements to the two motors 4 and therefore to the driving pulleys 6*a*.

This difference of movement determines a variation in the tension of the branches of the flexible transmission elements 6*c*, which means that the tension present in the flexible-element stretches comprised between one driving pulley and the driven pulley 6*b* is modified. This tension changes modify the overall force acting on the driven pulley 6*b* and the output shaft 3 and, therefore, the mechanical pliability of the output is modified.

In detail, the above described tension variation of the flexible transmission elements 6*c* is made possible due to the advantageous presence of at least one of the aforesaid spring bodies 7 which act on the flexible transmission elements 6*c* directly, therefore without the interposition between the spring bodies 7 and the flexible transmission elements 6*c* of pulleys or other similar items. More specifically, the at least one spring body 7 by acting on each stretch of flexible transmission element 6*c* comprised between a motor 4 and the output 3, enables said tension variations of the elements themselves to be absorbed and therefore the output pliability to be varied in a continuous manner.

In conclusion, the presence of this spring body 7 enables the tension in said elements to be varied in a continuous manner and consequently the pliability of the output shaft 3 to be varied in a continuous manner.

In addition, the elastic body 7, by exerting a force on the flexible element 6*c*, guarantees said minimum tension and therefore motion transfer from motors 4 to the output shaft 3 under any use condition and avoids an excessive decrease in the tension of the flexible transmission elements 6*c* due to the above described variation, thus determining the non-passage of motion between motors 4 and the output shaft 3.

As shown in the FIGS. 3*a*, 3*b*, 4, 5*a*, and 5*b*, the elastic bodies 7 present a first extreme bonded to one of the flexible transmission elements 6*c* and the second extreme fixed to the holding structure 2 in order to advantageously download, on said holding structure 2, the forces acting on the flexible transmission elements 6*c*.

In addition to the above details, actuator 1 is advantageously provided with a control unit 9 integrated in the actuator. The control unit 9 is preferably arranged between the two motors 4 and is adapted to control operation of actuator 1 governing at least the movement of motors 4 in an independent manner.

The control unit 9 is adapted to adjust the operating parameters of said motors 4 by varying the relative rotation of pulleys 6*a* and, as a result, the output parameters of shaft 3. In detail, the control unit 9 is adapted to adjust at least the pliability of the output shaft 3 through the elastic transmission system. In greater detail, it controls motors 3 by determining pliability, torque, speed and position of at least the output shaft 3.

Modification of such parameters by the control unit 9 is carried out based on information that may concern the movable component 102, such as speed and acceleration, the physical-mechanical features of actuator 1 or the type of working to be carried out, such as the required quality, or the features of the piece to be handled.

Finally, the control unit 9, in addition to said command function, is adapted to verify the state of the variable pliability actuator 1 and more specifically the state of motors 4 and output shaft 3, due to the presence of sensors belonging to the motors 4 and output shaft 3, as better described below.

Alternatively, the inner control unit 9 can be connected for data passage to a computer or other similar element external to unit 1 and adapted to send the information necessary for selection of the physical-mechanical features of actuator 1 and the type of movement to be carried out. In particular, this connection can be obtained by cable or through an antenna adapted to wireless connect actuator 1 to the computer. Preferably this antenna, not shown in FIG. 4, is placed inside the holding structure 2.

The variable pliability actuator 1 can be provided with at least one bus 10 (FIGS. 1 and 2) or other similar element adapted to mutually connect two or more variable pliability actuators carrying out a preferably serial connection between several actuators 1 bringing them into mutual communication for data passage.

Buses 10 therefore allow all actuators 1 present in a robot 100 to be controlled through a single external computer that, through a bus 10, is directly in connection for data passage with only one actuator 1 and, due to the other buses 10, indirectly connected with the other actuators 1. The information is therefore transmitted from the external computer to an actuator 1 which, thanks to buses 10, transmits this information to the other actuators present. These buses 10 not only enable passage of information, but also allow passage of energy between the actuators so that the whole robot 100 can be powered through a single powering source. This source is therefore directly connected to one alone of actuators 1 and brought into connection for energy passage with the other actuators 1, thanks to buses 10.

Figure 3B:
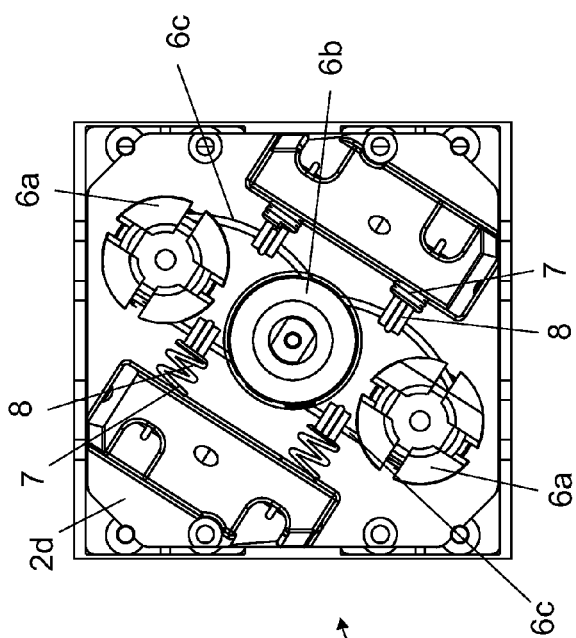
FIG. 3b shows a second configuration of the middle portion of the actuator seen in FIG. 2.
Figure 3A:
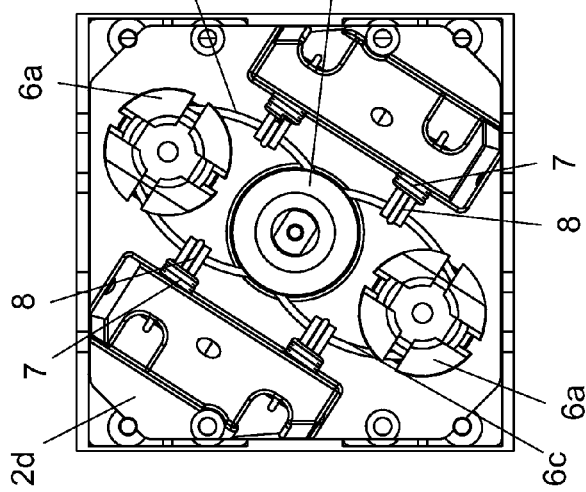
FIG. 3a shows a configuration of a middle portion of the variable pliability actuator seen in FIG. 2.

A first preferred example of elastic transmission system is represented in FIGS. 2, 3a and 3b.

Therein the flexible transmission elements 6c are at least two and each of these two flexible transmission elements 6c are capable of connecting one of the driving pulleys 6a with a driven pulley 6b. Preferably, the flexible transmission elements 6c are four in number and each of them is suitably secured through said mechanical anchoring devices to one driving pulley 6a and the driven pulley 6b so that they are operatively connected. The driven pulley 6b is preferably of the two-race type, i.e., it has seats each of which accommodates two of the four flexible elements 6c so as to allow the two driven pulley 6b to act on the driven pulley 6b independently of each other and, therefore, without interfering with each other.

In detail, said particular configuration, contrary to what happens in an elastic transmission system provided with a single belt, allows elastic transmission system and then the actuator 1 to distribute any external force, acting on the output shaft 3, on both the driving pulleys 6a.

In detail, the operating connection between the driving pulleys 6a and driven pulley 6b (FIGS. 3a and 3b) is obtained as follows. Two flexible elements 6c are secured on each driving pulley 6a, which elements pass over opposite parts of the same driving pulley 6a and are then secured to the driven pulley 6b.

In this preferred configuration, the driven pulley 6b is placed almost in the middle of the two driving pulleys 6a and, at the same time, the three pulleys 6a and 6b have the respective rotation axes substantially lying in the same plane. Therefore, as shown in FIG. 2, the driving output 3b appears to be almost in the middle of a face of the cube defined by structure 2.

In this case, the spring bodies 7 are four helical springs and preferably of the tractive type. Each of them acts on a stretch of the flexible element 6c comprised between one driving pulley 6a and the driven pulley 6b. Preferably, the four spring bodies 7 have major extension directions substantially parallel to each other and in particular the major extension directions belonging to spring bodies 7 acting on the same flexible element 6c are substantially coincident. Finally, each of the spring bodies 7 has one end secured to the holding structure 2 and, more specifically, to the intermediate plate 2d, while the other end is provided with a bushing 8 inside which a portion of a flexible element 6c is lodged thus enabling the spring body 7 to set the relative flexible element 6c in traction and ensure a minimum stretch thereto. In particular, bushing 8 allows the flexible transmission element 6c to run inside it with low friction thereby limiting deterioration thereof and improving performance of actuator 1.

Shown in FIGS. 4, 5a and 5b is a second preferred configuration of the elastic transmission system.

Therein pulleys 6a and 6b are disposed according to the vertices of a triangle, preferably of a practically equilateral triangle and therefore the driven pulley 6b is placed in the vicinity of one of the edges of lid 2c. Finally, the driven pulley 6b is of the one-race type and the flexible transmission element 6c is only one. Connection between the pulleys, 6a and 6b, and the flexible transmission element 6c in this particular case is obtained as follows: the flexible element 6c is secured to each pulley 6a and 6b and makes a full turn around it before reaching the following pulley. In particular, the flexible element 6c has both its ends secured to a driving pulley 6a.

Figure 6:
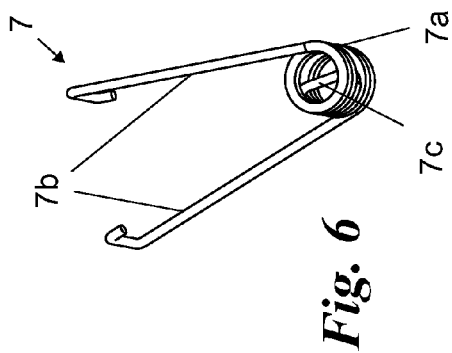
FIG. 6 reproduces a detail of the actuator in FIG. 4.

In this configuration, the spring body 7 is advantageously made up of a cylindrical spiral torsion spring. In particular, the elastic transmission system comprises only one spring body 7 which consists of a cylindrical spiral torsion spring that is advantageously hinged on a suitable pin, not shown in the figures, present in the intermediate plate 2d. This cylindrical spiral torsion spring, shown in FIG. 6, has a cylindrical middle part 7a consisting of a metal wire suitably wound up and has two final portions 7b of a substantially L-shaped configuration so that each final portion is suitable for engagement with the flexible transmission element 6c, as shown in FIGS. 5a and 5b.

The cylindrical spiral torsion spring is characterized by a retainer 7c adapted to prevent rotation of the middle part 7a relative to said pin. In particular, this retainer 7c is formed with a portion of the wire constituting the middle part which is suitably bent and disposed diametrically. This retainer 7c is inserted in a suitable slit formed in the pin of the intermediate plate 2d so that the middle part 7a is steadily secured to the intermediate plate 2d.

The aforesaid positioning of retainer 7c allows two different tensions to be present on the two final portions 7b of the spring. In fact, when a force acts on one of the two final portions 7b, it is discharged by the retainer 7c onto the intermediate plate 2e thus leaving the stretch of the spring body 7 included between the retainer 7c and the other final portion 7b almost released.

Operation of the variable pliability actuator described above as regards structure is the following.

First the robot 100 is made and, more specifically, an integral component 101 is secured to an actuator 1 on an outer face of the holding structure 2 through the stiff coupling elements 5.

Afterwards, the movable component 102 is secured to actuator 1. In detail, one end of the movable component 102 is rigidly connected to the driving output 3b through screws or other similar means, while a second end is housed in the support output 2e in an idle manner, i.e., being free to rotate relative to the support output 2e.

Once the robot 100 has been completed, it is activated and the movable component 102, moved by motors 4, starts rotating relative to the fixed component 101 by virtue of actuator 1.

At the beginning, motion of the movable component 102 is of the accelerated type and the elastic transmission system is set in such a manner that the output shaft 3 has a minimum pliability. In particular, this minimum pliability is maintained over almost the whole acceleration due to motors 4 having almost the same rotation speeds, i.e., the same way and the same modulus.

In the first elastic transmission system, the minimum-pliability configuration, represented in FIG. 3b, is obtained by setting in traction one of the two flexible transmission elements 6c connecting each driving pulley 6c to the driven pulley 6b, while the other element is maintained to the minimum tension by the relative spring body 7.

In the second elastic transmission system, in the minimum-pliability condition (FIG. 5), the two portions of the flexible element 6c that are adjacent to the driven pulley 6b are set in traction, while the stretch included between the two driving pulleys 6a is almost released.

Once the steady running speed has been reached, motion of the fixed component 101 becomes uniform and, for safety reasons, the external computer controls the output pliability so that it is brought to the maximum value. In particular, the external computer sends the command to an actuator 1 that, due to buses 10, passes this information to the other actuators. In greater detail, this information only reaches the actuators to which a command is given for modifying their pliability.

Said increase is carried out by differentiating the speed of the two motors 4. In particular, the speeds of motors 4 keep the same way but have a different modulus. This difference gives rise to a reduction in the tension acting on at least part of the flexible element 6c and therefore an increase in pliability. Under this situation, the advantageous presence of the spring body 7 allows tension to be varied in a continuous manner at least on each stretch of the flexible transmission element 6c included between one driving pulley 6a and the driven pulley 6b.

In addition, the spring body 7 causes the portion of the flexible element 6c that is released to have a tension at least as high as a predetermined minimum value ensuring the continuity in motion passage from the driving pulley 6a to the driven pulley 6b.

In particular, in the first configuration of the elastic transmission system, the maximum-pliability configuration shown in FIG. 3a, the four flexible elements 6c substantially have the same tension and the four spring bodies 7 apply the same force to elements 6c. In the second configuration, the maximum pliability (FIG. 5a) involves that the portions of the flexible element 6c adjacent to the driven pulley 6b will be maintained to a minimum tension by the spring body 7, while the stretch included between the two driving pulleys 6a is to the maximum tension.

When the maximum pliability is reached, the speeds of the two motors become the same again and the movable component 102 moves forward until it is close to the final position.

Once the robot 100 is about to reach said final position, the speed of the movable component 102 decreases and the pliability of the output shaft 3 decreases to the minimum value (FIGS. 3a and 5a) so that the robot 100 will be given a pliability sufficient to absorb possible vibrations and therefore to ensure a high working accuracy.

This reduction in pliability is obtained by rotating the electric motors 4 to speeds having opposite ways, thus giving rise to an increase in the tension of the previously released portions of elements 6c.

Finally, the particular configurations of the elastic transmission system allow the movable component 102 to be moved manually when motors 4 are shut off, i.e. by a force applied to the movable component 102 from the outside, thus avoiding a future malfunction of actuator 1.

In addition, the control unit 9, due to the presence of the above described sensors, is able to recognize which is the state of actuator 1 after manual movement thereof. In detail, the control unit 9 recognizes the pliability of the output shaft 3 based on the angular position of the motors 4 and output shaft 3 enabling actuator 1 to restart from a known-pliability configuration.

For instance, in the second preferred example, by moving the movable component 102 the driven pulley 6b is set in rotation. This rotation causes a decrease in tension in the stretch of the flexible element 6c included between the driven pulley 6a and one driving pulley 6a. As a result, the other portion of the flexible element 6c is in traction and therefore the second driving pulley 6c rotates pulling the portion of element 6c that is placed between the two driving pulleys 6a. Finally, the manual motion sets actuator 1 to a maximum pliability condition, due to the action of the spring body 7.

The invention achieves important advantages.

In fact, since actuator 1 is able to quickly vary its pliability, an optimal working quality and high safety are ensured at each instant.

In addition, actuator 1 enables almost the whole potential capacity of a robot 100 to be utilized at best, which will bring about lower production times and costs. In fact, due to the possibility of quickly varying the actuator pliability, the robot 100 can be moved at its greatest speed while ensuring a high safety and at the same time can offer a high accuracy when, for instance, it is putting an object in place.

A further advantage is represented by the possibility of rigidly connecting actuator 1 simultaneously to several integral components 101 and/or actuators 1, due to the presence of the stiff coupling elements 5 enabling easy and quick fastening.

Another advantage resides in the high stability of the movable component 102 during its rotation since the latter is fastened at two coaxial points, the driving output 3b and support output 2e.

A further advantage is represented by the reduced bulkiness of the elastic transmission system; in fact, due to the reduced sizes of the latter, actuators 1 of small sizes and therefore smaller robots 100 are manufactured.

A fundamental advantage obtained with actuators 1 is the high reliability and duration. In particular, the first example (FIGS. 2, 3a and 3b) is characterized by an advantageous position of pulleys 6a and 6b enabling the forces acting on the output shaft to be minimized and a long duration of actuator 1 to be ensured, while in the second example (FIGS. 4, 5a and 5b) there is advantageously a smaller number of components, which will involve a high reliability.

In addition, the particular geometries of the elastic transmission system enable starting of actuator 1, after manual movement of the movable component 102, in a configuration of known pliability. In particular, the actuator is restarted in the minimum-pliability configuration.

An important goal achieved by the present variable pliability actuator is represented by the fact that an external control is not necessary. In fact, the advantageous presence of the control unit 9 allows the connections required for control of the robot movements to be simplified. Due to this possibility, therefore, the number of cables or other devices necessary to a computer for carrying out this control is reduced.

Furthermore, the presence of buses 10 allows all actuators 1, and consequently all movements of a robot 100, to be controlled through a single connection with the external computer. In fact, due to the presence of buses 10, all information reaching an actuator 1 can be transmitted to all actuators present in robot 100. In conclusion, due to the presence of the control unit 9 within the variable pliability actuator 1, an almost independent actuator 1 can be obtained which therefore can be easily used under any situation. Moreover, actuator 1 can be easily connected to the rest of the robot components and, in particular, at least to a movable component 102, due to the presence of the coupling elements 5. The invention is susceptible of variations falling within the scope of the inventive idea. All of the details can be replaced by equivalent elements and the materials, shapes and sizes can be of any nature and magnitude.

The invention claimed is:

1. A variable pliability actuator (1) adapted to move a movable component (102), comprising:
   two electric motors (4) of the rotary type,
   at least one output shaft (3) adapted to be set in rotation by said two electric motors (4) around a rotation axis (3*a*);
   an elastic transmission system (6, 7) connected to transfer motion from said motors (4) to said output shaft (3) and to vary the pliability of said output shaft (3), wherein said elastic transmission system (6, 7) comprises two driving pulleys (6*a*) each rigidly connected to one of said two electric motors (4), a driven pulley (6*b*) rigidly connected to said output shaft (3), and at least one flexible transmission element (6*c*) suitable for motion transfer from said driving pulleys (6*a*) to said driven pulley (6*b*) and at least one spring body (7) connected to directly act on said flexible transmission elements (6*c*);
   a control unit (9) integrated in said variable pliability actuator (1) to adjust at least the pliability of said output shaft (3) through said elastic transmission system (6, 7);
   a holding structure (2) defining an outer surface and an inner volume (2*a*) to hold at least said two electric motors (4), said elastic transmission system (6, 7), said output shaft (3) and said control unit (9);
   said holding structure (2) comprising:
      a driving output (3*b*) placed at said outer surface, which is controlled by said output shaft (3) to set said movable component (102) in rotation about said rotation axis (3*a*),
      at least one stiff coupling element (5) providing a stiff connection of said holding structure (2) and at least one of an actuator and an integral component, and
      a support output (2*e*) opposite to the driving output (3*b*) and substantially coaxial with said rotation axis (3*a*) and partly housing said movable component (102) stabilizing said rotation of said movable component (102).

2. An actuator (1) as claimed in claim 1, wherein said control unit (9) controls the angular position of said output shaft (3) and motors (4) in an independent manner.

3. An actuator (1) as claimed in claim 1, wherein said control unit (9) is placed inside said inner volume (2*a*) and controls said two motors (4) in an independent manner to determine different speeds in said two motors (4).

4. An actuator (1) as claimed in claim 1, comprising at least one bus (10) adapted to mutually connect said actuator (1) to another actuator enabling at least data passage.

5. A robot (100) comprising the actuator (1) as claimed in claim 1, which is rigidly secured, through said at least one stiff coupling element (5), to the integral component (101) and is configured to move said movable component (102) relative to said integral component (101).

6. A variable pliability actuator (1) comprising an elastic transmission system (6, 7) connected to transfer motion from two motors (4) to an output shaft (3) and to vary the pliability of said output shaft (3); said elastic transmission system (6, 7) comprising:
   two driving pulleys (6*a*) each rigidly connected to one of said electric motors (4);
   a driven pulley (6*b*) rigidly connected to said output shaft (3);
   at least two flexible transmission elements (6*c*) each one connecting one of said driving pulleys (6*a*) and said driven pulley (6*b*), wherein each driving pulley (6*a*) is connected to said driven pulley (6*b*) by said flexible transmission elements (6*c*) so to transfer motion from each of said electric motors (4) to said output shaft (3); and
   at least two spring bodies (7) each interposed between one of said driving pulleys (6*a*) and said driven pulley (6*b*) and directly acting on said flexible transmission elements (6*c*).

7. An actuator (1) as claimed in claim 6, wherein four of said flexible transmission elements (6*c*) are provided and wherein each of said flexible transmission elements (6*c*) is connected between one of said driving pulleys (6*a*) and said driven pulley (6*b*).

8. An actuator (1) as claimed in claim 6, wherein four of said spring bodies (7) are provided and wherein each of said spring bodies (7) acts on each part of said flexible transmission elements (6*c*) comprised between said driving pulleys (6*a*) and said driven pulley (6*b*).

9. An actuator (1) as claimed in claim 6, wherein said flexible transmission elements (6*c*) are rigidly secured to said pulleys (6*a*, 6*b*) in order to avoid slipping actions with pulleys (6*a*, 6*b*).

10. An actuator (1) as claimed in claim 6, wherein said driven pulley (6*b*) is of the two-race type.

11. An actuator (1) as claimed in claim 6, wherein said pulleys (6*a*, 6*b*) define respective rotation axes that are substantially lying in the same plane.

* * * * *